United States Patent [19]
Harris et al.

[11] Patent Number: 6,097,395
[45] Date of Patent: Aug. 1, 2000

[54] DYNAMIC SELECTION OF LIGHTING COORDINATES IN A COMPUTER GRAPHICS SYSTEM

[75] Inventors: Kathleen A. Harris; David Pinedo, both of Fort Collins, Colo.

[73] Assignee: Hewlett Packard Company, Palo Alto, Calif.

[21] Appl. No.: 09/067,550

[22] Filed: Apr. 28, 1998

[51] Int. Cl.[7] .................................................. G06F 163/00
[52] U.S. Cl. ........................................... 345/426; 345/427
[58] Field of Search ..................................... 345/426, 427

[56] References Cited

U.S. PATENT DOCUMENTS

| 4,967,375 | 10/1990 | Pelham et al. | 364/518 |
| 5,379,370 | 1/1995 | Allain et al. | 395/122 |
| 5,745,125 | 4/1998 | Deering et al. | 345/503 |

OTHER PUBLICATIONS

"3D Recognition from 2D Line Drawings by Using the Orthogonal Axes of 3D Space", IBM Technical Disclosure Bulletin, vol. 33, No. 1A Jun. 1990.

*Primary Examiner*—Mark K. Zimmerman
*Assistant Examiner*—Lance W. Sealey

[57] ABSTRACT

A computer graphics system includes a lighting system that performs lighting efficiently by selecting dynamically the lighting space in which lighting calculations are to be performed to thereby minimize resources required to be expended to perform lighting. A particular preferred lighting coordinate system is then selected, based upon particular criteria, and the light source information is transformed to the selected coordinate system (if necessary) where lighting is performed. The dynamic selection can take many objective indicia into account, such as whether functions other than lighting must be performed in either of the coordinate systems, whether transformation of the lighting information is possible and the relative efficiencies of performing lighting in one coordinate system verses the other coordinate system. In another aspect, a lighting subsystem for use in a computer graphics system includes a dynamic light space selector for selecting dynamically a lighting space for performing lighting, a lighting processor for performing lighting and at least one switch operatively associated with and controlled by the dynamic light space selector to selectively enable the transformation of data from a first coordinate space to a second coordinate space prior to being input into the lighting processor. The dynamic light space selector thus controls the switch to operatively determine which coordinate system will be used to perform lighting in the lighting processor.

54 Claims, 10 Drawing Sheets

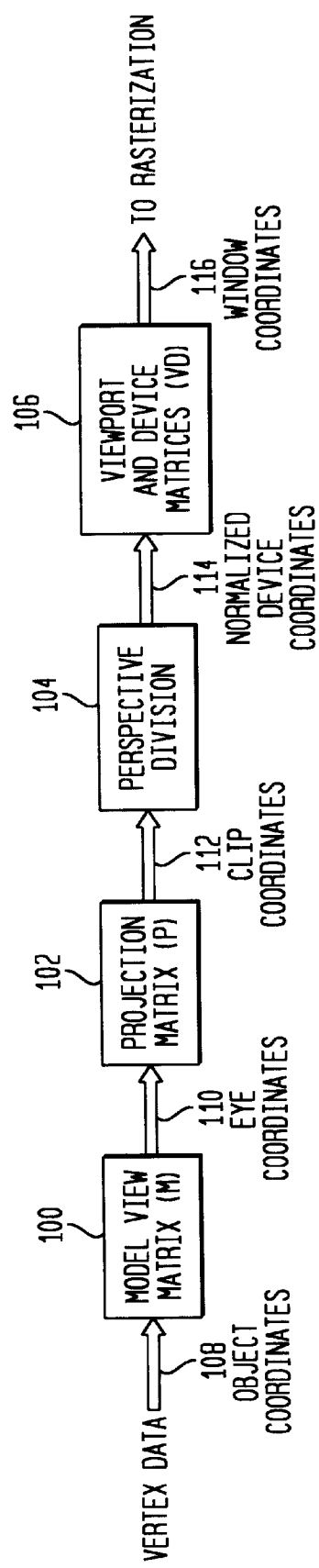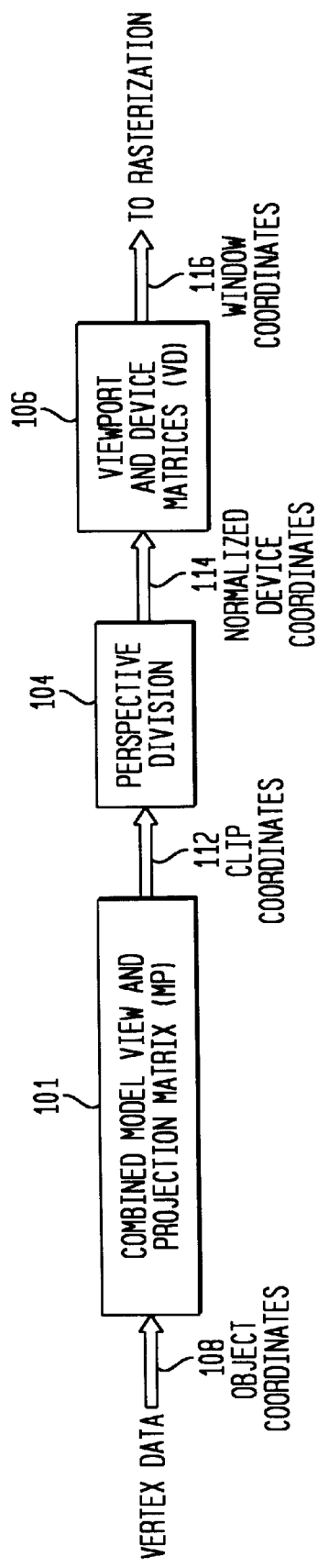

DYNAMIC SELECTION OF LIGHTING COORDINATES IN A COMPUTER GRAPHICS SYSTEM

BACKGROUND OF THE INVENTION

1. Field of The Invention

The present invention relates generally to a computer system for performing graphics operations and, more particularly, to a computer graphics and animation system that includes a lighting subsystem for performing lighting.

2. Related Art

Computer graphics systems are commonly used for displaying two- and three-dimensional graphical representations of objects on a two-dimensional video display screen. Current computer graphics systems provide highly detailed representations and are used in a variety of applications.

In a typical computer graphics system, an object or model to be represented on the display screen is broken down into multiple graphics primitives. Primitives are basic components of a graphics display and may include, for example, points, lines, vectors, and polygons such as triangles and quadrilaterals. Typically, a hardware/software scheme is implemented to render, or draw, the graphics primitives that represent a view of one or more objects being represented on the display screen.

Generally, the primitives of a three-dimensional object to be rendered are defined by a host computer in terms of primitive data. For example, when the primitive is a triangle, the host computer may define the primitives in terms of the coordinates (X, Y, Z, and W) of its vertices, as well as the red, green and blue and alpha (R, G, B and α) color values of each vertex. Additional primitive data may be used in specific applications. Rendering hardware interpolates the primitive data to compute the display screen pixels that represent each primitive, and the R, G, and B color values for each pixel.

The basic components of a computer graphics system typically include a graphics interface and some specialized graphics system hardware. The graphics interface is provided generally to enable graphics applications located on the host computer to control efficiently the graphics system hardware. One of the more popular graphics interfaces is the OpenGL® standard, which provides an application program interface (API) to the graphics system hardware. (OpenGL is a registered trademark of Silicon Graphics, Inc.).

The OpenGL software interface provides specific commands that are used to specify objects and operations to produce interactive, three-dimensional applications. OpenGL is a streamlined, hardware-independent interface designed to be implemented on many different hardware platforms. As such, in computer systems that support OpenGL, the operating systems and graphics application software programs can make calls to the computer graphics system according to the standardized API without knowledge of the underlying hardware configuration.

The OpenGL standard provides a complete library of low-level graphics manipulation commands for describing models of three-dimensional objects (the "GL" of OpenGL refers to "Graphics Library"). This standard was originally based on the proprietary standards of Silicon Graphics, Inc., but was later transformed into an open standard that is used in high-end graphics-intensive workstations, and, more recently, in high-end personal computers. The OpenGL standard is described in the OPENGL PROGRAMMING GUIDE, version 1.1 (1997), the OPENGL REFERENCE MANUAL, version 1.1 (1997), and a book by Segal and Akeley (of Silicon Graphics, Inc.) entitled THE OPENGL GRAPHICS SYSTEM: A SPECIFICATION, version 1.1 (1995), all of which are hereby incorporated by reference in their entirety.

The graphics system hardware typically includes a geometry accelerator, a rasterizer, and a frame buffer. The graphics system may also include other hardware such as texture mapping hardware. The geometry accelerator receives primitive data from the host computer via the graphics interface. The primitive data defines the primitives that make up a view of the model to be displayed. The geometry accelerator performs transformations on the primitive data and may also perform such functions as lighting and view and model clipping for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware, if available, are combined and stored in the frame buffer for display on the video display screen.

In the OpenGL lighting model, one or more light sources can be individually controlled. OpenGL typically allows 8 or more light sources to be defined for any particular scene. Many parameters can be defined for each of these light sources. For example, it is possible to define the position, focus, direction, attenuation and color of each light source. OpenGL uses the defined light source information to perform lighting of geometric primitives to produce optical effects on the scene.

OpenGL specifies that light sources are to be defined in object coordinates. The term "object coordinates" is used generally to refer to a coordinate system associated with the physical item to be modeled. OpenGL further specifies that the defined light source information is to be transformed from object coordinates to eye coordinates and stored in eye coordinates. The term "eye coordinates" is used generally to refer to a coordinate system associated with the way in which the object or model is viewed in the particular scene. Coordinates, coordinate space and space will be used interchangeably herein.

An illustration may be helpful to understand the difference between eye coordinates and object coordinates. For example, think of a book sitting on a desk. The eye coordinate system would be affixed to the desk with, for example, the X coordinate extending along the front of the desk, the Y coordinate extending along the left side of the desk and the Z coordinate extending perpendicularly above the surface of the desk. The object coordinate system would be affixed to the book itself in a convenient manner, for example so as to define X', Y' and Z' coordinate axes as extending along the edges of the book. Using a coordinate system fixed to the book is simply a matter of convenience that simplifies specification of the object being defined. In this example, since the object coordinate system is attached to the edges of the book, it is easy to define the book as extending, for example, two units along the X' direction, three units along the Y' direction and 1 unit along the Z' direction. After the object has been defined in object coordinates, the object coordinate data can be easily translated into eye coordinates simply by multiplying the object coordinate data by a transformation matrix. In OpenGL, a 4×4 matrix referred to as the "model view matrix" (M) is used to transform data from object coordinates to eye coordinates.

As noted above, OpenGL specifies that light sources are defined in object coordinates and that the light source information is to be transformed into eye coordinates and stored in eye coordinates. The stored light source information is used, in connection with vertex and normal data, to perform lighting. Both the light source information and the vertex and normal data must be in the same coordinate systems to perform lighting.

The light source information stored in eye coordinates may be used directly to perform lighting in eye coordinates or may be re-transformed from eye coordinates to object coordinates to perform lighting in object coordinates. Using the light source information to perform lighting in eye coordinates will be referred to herein as "eye coordinate lighting" whereas using the light source information to perform lighting in object coordinates will be referred to herein as "object coordinate lighting."

Since the light source information is stored in eye coordinates while vertex and normal data is provided in object coordinates, eye coordinate lighting requires that the normals and vertices of all primitives be translated from object coordinates to eye coordinates. Such a transformation is resource intensive and can form a processing bottleneck in the operation of the computer graphics system.

Object coordinate lighting is advantageous in that it enables lighting to be performed without transforming normal and vertex data from object coordinates to eye coordinates. Performing lighting in object coordinates, however, is not without price. As noted, to perform object coordinate lighting, it is necessary to re-transform the light source information from eye coordinates to object coordinates. Further, since the re-transformed light source information represented in object coordinates is a function of the model view matrix (M), this re-transformation of light source information must take place any time the model view matrix (M) changes. This re-transformation of light source information is also resource intensive and can itself form a processing bottleneck in the computer graphics system.

Accordingly, there is a need for an efficient technique to perform lighting in a computer graphics system. Further, there is a need for a geometry accelerator or graphics pipeline that can perform lighting efficiently for use in a computer graphics system.

SUMMARY OF THE INVENTION

The present invention is a computer graphics system including a lighting subsystem or a geometry accelerator that performs lighting efficiently by selecting dynamically the coordinate system in which lighting is to be performed. The present invention thereby minimizes required resources for performing lighting thus increasing the overall performance of the graphics system.

In one embodiment, the lighting subsystem utilizes a heuristic to determine whether lighting calculations should be performed in object coordinates or eye coordinates. This heuristic may take into account various factors, including the rate at which vertex data is delivered to the geometry accelerator and the frequency with which the model view matrix changes. Additionally, the heuristic may take into account a user's manual selection of one of the two lighting coordinate systems to thereby override the dynamic selection process. Likewise, the heuristic may take into account that another function, such as fogging or texture generation, will require transformation of vertex data from object coordinates to eye coordinates.

This invention is also related to a method for selecting dynamically lighting coordinates in a computer graphics system. This method generally includes the steps of selecting dynamically a lighting coordinate system, and performing lighting in the selected coordinate system. Light source information may be stored in one of the coordinate systems and may then be transformed, if necessary, to the selected coordinate system prior to performing lighting. The dynamic selection can take many objective indicia into account, such as whether functions other than lighting must be performed in either of the coordinate systems, whether transformation of the light source information is possible and the relative efficiencies of performing lighting in one coordinate system verses the other coordinate system.

The invention further relates to a lighting subsystem for use in a computer graphics system. The lighting subsystem preferably includes a dynamic light space selector for selecting dynamically a lighting space in which lighting is to be performed, a lighting processor for performing lighting and at least one switch operatively associated with and controlled by the dynamic light space selector to selectively enable the transformation of vertex or normal data from a first coordinate space to a second coordinate space prior to being input into the lighting processor. The term "coordinate space" will be used herein synonymously with "coordinate system" and the term "lighting space" will be used herein synonymously with "lighting system." The dynamic light space selector thus controls the switch to operatively determine which coordinate system will be used by the lighting processor to perform lighting.

In one embodiment, the dynamic light space selector first determines if a lighting space needs to be selected. If so, the dynamic light space selector determines whether performing lighting in object coordinates would be faster than performing lighting in eye coordinates. One way to do this is to observe the rate with which vertex data is supplied to the hardware. In OpenGL this may be accomplished by noting if the computer graphics system is operating in immediate mode or in another mode, such as display list, vertex array or draw array set. If the system is in immediate mode, eye coordinate lighting is selected. If the system is in a faster mode, object coordinate lighting is selected. Thus, the invention can dynamically select the lighting space to prevent the transformation of vertex data or light source information between lighting coordinate spaces from degrading or limiting performance of the graphics system.

In yet another embodiment, the invention stores the light source information in object coordinates before determining if lighting should take place in object coordinates or eye coordinates. If lighting is determined to take place in object coordinates and the model view matrix has not changed, lighting can take place in object coordinates using the light source information without requiring the transformation of any information through the model view matrix. In this situation, a substantial savings in resources may be accomplished.

This invention may be advantageously employed in a graphics accelerator formed in hardware, a graphics pipeline formed from software, or any combination of hardware, software and firmware.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 1A is a block diagram illustrating different coordinate spaces in which graphical operations are performed when performing eye coordinate lighting;

FIG. 1B is a block diagram illustrating different coordinate spaces in which graphical operations are performed when performing object coordinate lighting;

DETAILED DESCRIPTION

Figure 2:
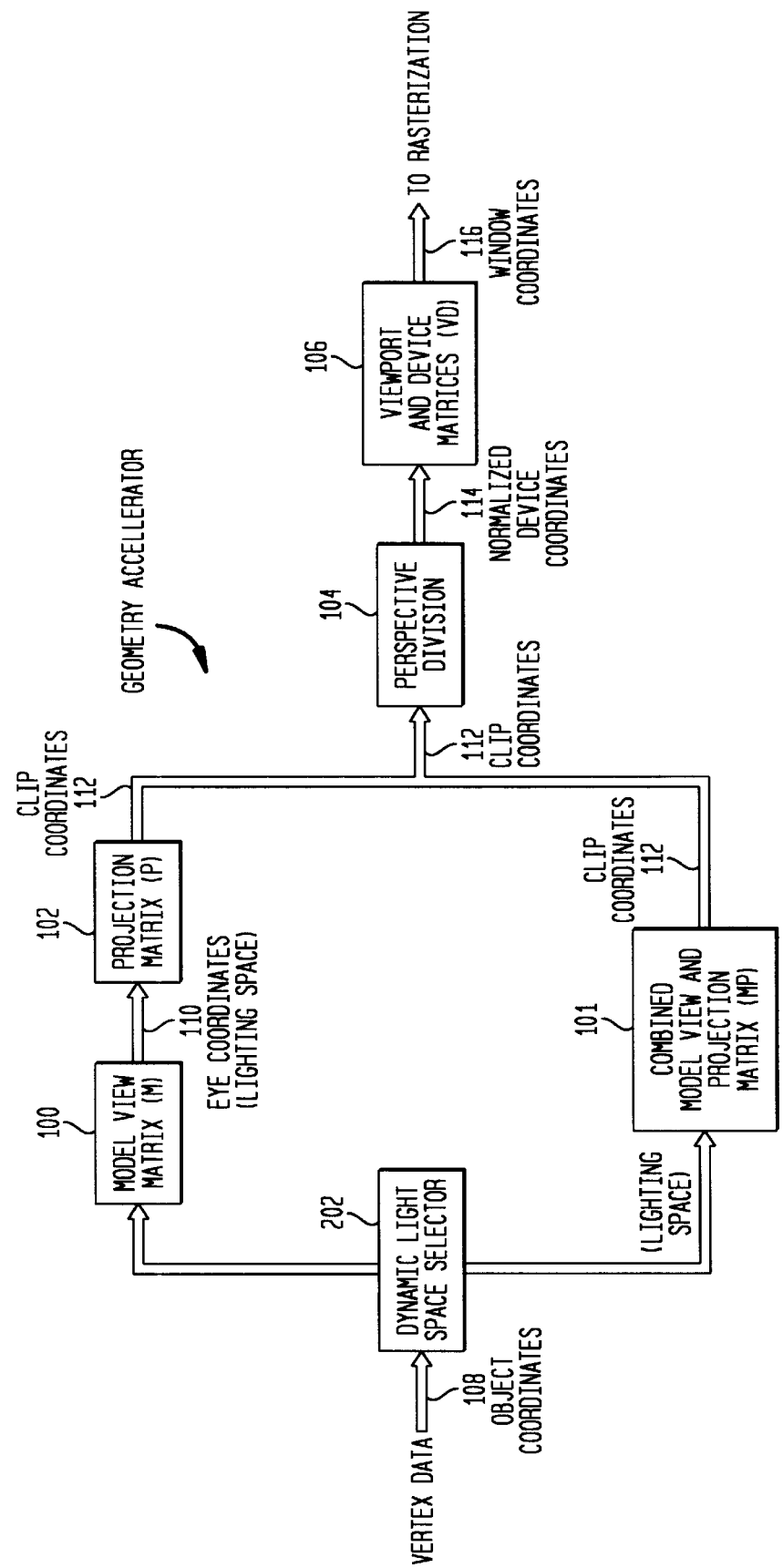
FIG. 2 is a block diagram illustrating an exemplary embodiment of one aspect of the present invention which selects dynamically between two different coordinate spaces in which to perform lighting calculations.

To facilitate understanding of this invention, references is now made to FIGS. 1A, 1B and 2, which depict one implementation of transforming vertex data from object coordinates 108 to window coordinates 116. As shown in FIG. 1A, after a graphics primitive is assembled in object coordinates 108, the vertex data defining the primitive is transformed into eye coordinates 110 where lighting is performed, by multiplying the vertex data by a model view matrix (M) 100. The vertex data is then transformed from eye coordinates 110 to clip coordinates 112, where clipping is performed. The transformation is performed by multiplying the vertex data by a projection matrix (P) 102. After performing clipping, the vertex data is transformed to window coordinates 116 (window space) by performing perspective division 104 and multiplying the vertex data by viewport (V) and device (D) matrices 106. Typically this transformation to window coordinates 116 is performed by multiplying the vertex data by a concatenation of the viewport (V) and device (D) matrices. The vertex data in window coordinates is then forwarded for rasterization.

Instead of performing eye coordinate lighting, which requires the vertex data to be transformed to eye coordinates 110, it is sometime possible to perform object coordinate lighting. As shown in FIG. 1B, if lighting is performed in object coordinates and the vertex data is not otherwise required to be transformed to eye coordinates, the vertex data can be transformed directly to clip coordinates 112 by multiplying the vertex data by a concatenation of the model view matrix (M) and projection matrix (P) 101. After clipping is performed, the vertex data is transformed to window coordinates 116 using the same process described above with respect to FIG. 1A.

One aspect of this invention relates to a geometry accelerator that dynamically switches between lighting in eye coordinate space 110 and lighting in object coordinate space 108. This aspect is diagrammatically illustrated by the geometry accelerator in FIG. 2, in which dynamic light space selector 202 performs the functions of determining whether lighting calculations are to be performed in object coordinates 108 or eye coordinates 110. Once this decision has been made, lighting is performed in the selected coordinate space (eye or object coordinates). The vertex data is then transformed into clip coordinates 112 and, subsequently, into window coordinates 116 in the same manner described above with respect to FIGS. 1A and 1B.

The embodiments illustrated in FIG. 2 and otherwise described herein may be implemented in software, hardware or any combination of software, firmware and hardware. As used herein, the term geometry accelerator is intended to be generic to a graphics accelerator implemented in hardware and a graphics pipeline implemented in software.

Figure 3:
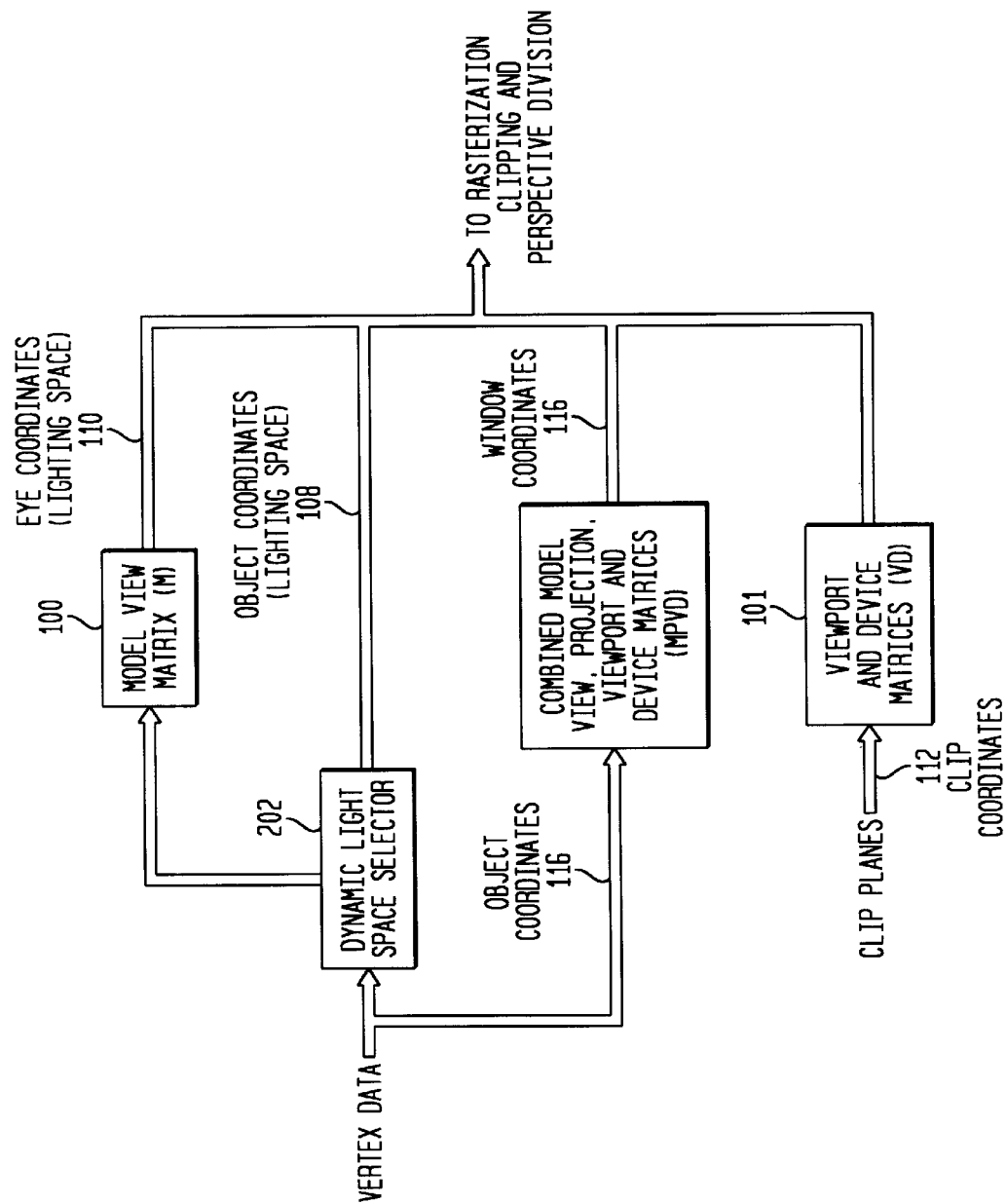
FIG. 3 is a block diagram illustrating another exemplary embodiment of one aspect of the present invention which selects dynamically between two different coordinate spaces in which graphical operations can be performed when performing lighting.

The vertex data can take any one of a number of paths through the geometry accelerator. For example, as shown in FIG. 3, it is possible to process in parallel lighting in either object or eye coordinates and transformation of vertex data from object coordinates 108 to window coordinates 116. Clip planes are typically pre-computed and transformed from clip coordinates 112 to window coordinates 116. The results of the lighting, the transformed clip planes and transformed vertex data are then all forwarded for rasterization, clipping and perspective division. This parallel process may be especially suited for implementation in hardware.

Figure 4:
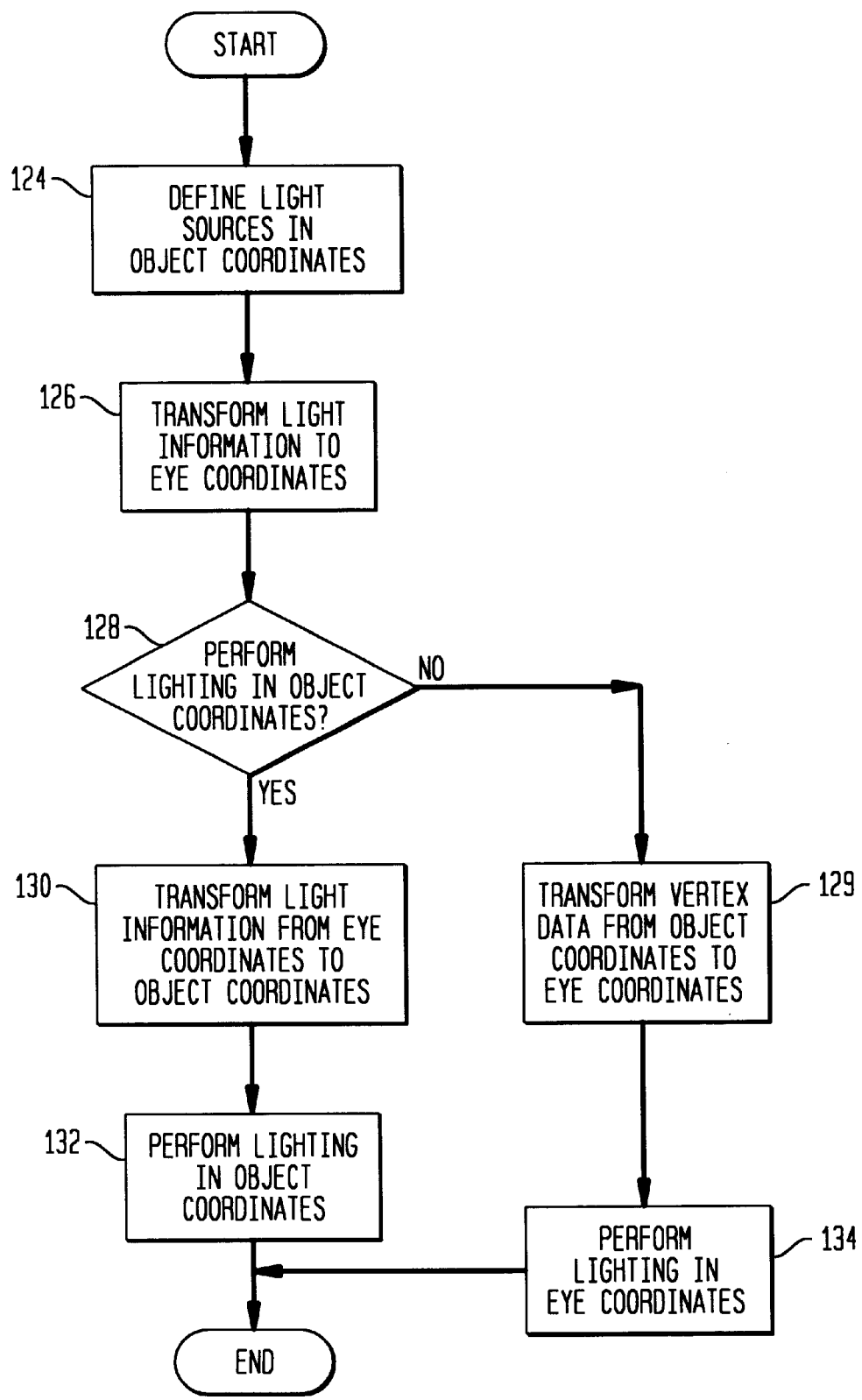
FIG. 4 is a flowchart exemplifying one embodiment of the operation of selecting dynamically the coordinate system in which lighting is to be performed.
Figure 5:
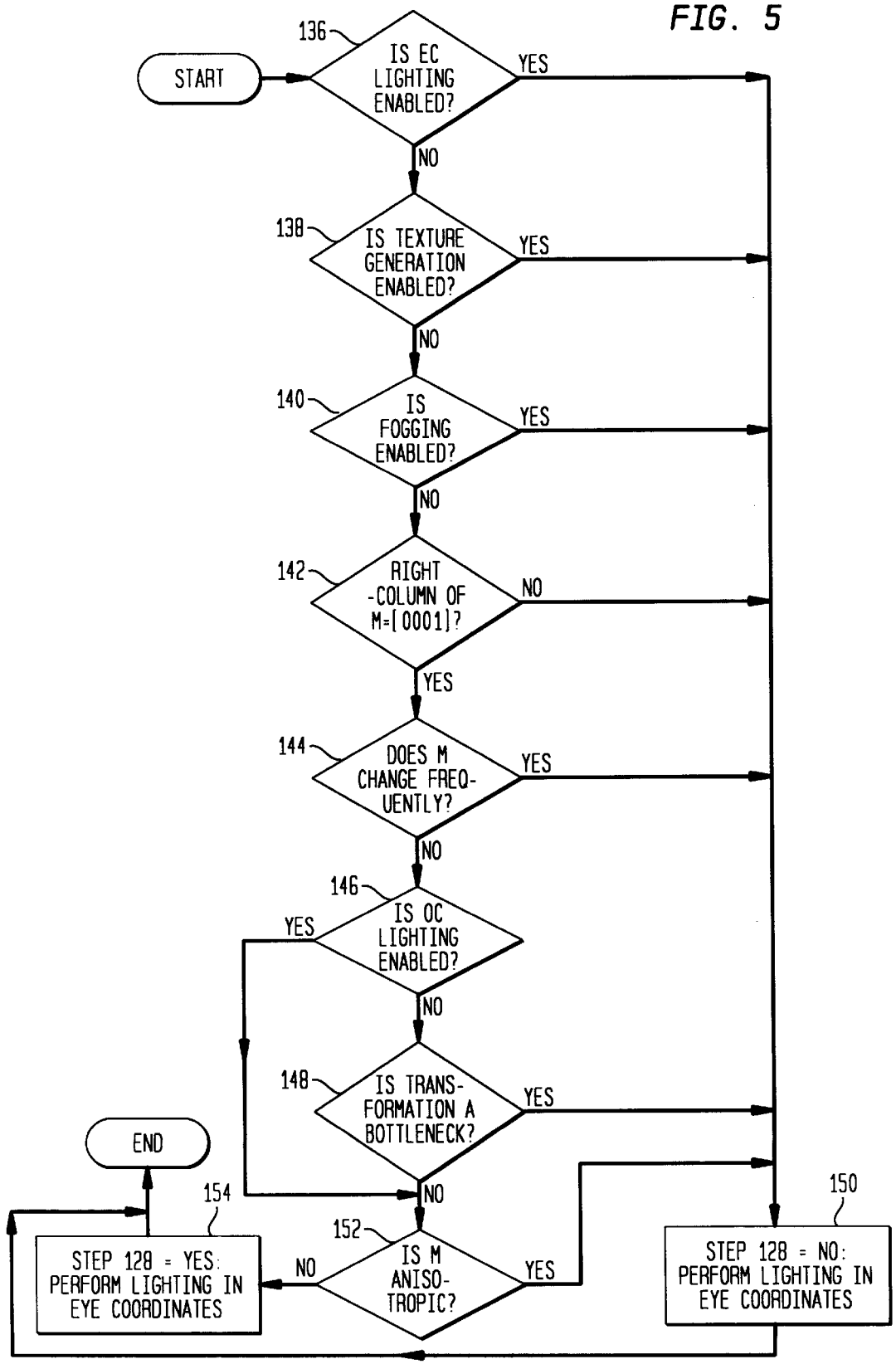
FIG. 5 is a flowchart exemplifying a possible heuristic that may be used at step 128 of FIG. 4 to select the coordinate system in which lighting is to be performed.

The decision process performed by the dynamic light space selector 202 will now be explained more fully with reference to FIGS. 4 and 5, in which FIG. 4 is a flowchart exemplifying one embodiment of the operation of selecting dynamically the coordinate system in which lighting is to be performed, and FIG. 5 is a flowchart exemplifying a possible heuristic that may be used to select whether lighting should be performed at step 128 of FIG. 4. These figures are particularly useful for illustrating the determination process as it would be applied to software, however the following explanation applies equally to functions performed by hardware or firmware should the selection process be embodied in such an apparatus.

In one embodiment, the dynamic determination is implemented in software routines which interoperate with the components of the geometry accelerator to perform the graphics functions in accordance with the present invention. Such software routines typically reside in a computer memory and/or disk storage devices, and may be stored on any other computer-readable medium such as, for example, magnetic disk, compact disc or magnetic tape, and may be loaded into the computer or geometry accelerator using an appropriate peripheral device as known in the art. Preferably, this embodiment of the geometry accelerator is implemented in any well-known functional or object-oriented programming language such as C or C++. Those skilled in the art will appreciate that different implementations, including different function names, programming languages, data structures, and/or algorithms may also be used in embodiments of the present invention other than those described below. It should be further understood that the invention is not limited to a particular computer platform, particular operating system, particular processor, or particular high level programming language, and that the hardware components identified above are given by way of example only. The geometry accelerator may be implemented, for example, in dedicated hardware, firmware, or any combination thereof.

In OpenGL, as shown in FIG. 4 at block 124, light sources are defined in object coordinates. OpenGL requires that light sources be defined in object coordinates, however other application program interfaces ("APIs") may adopt other conventions. Examples of the types of information defined in a light source include the intensity, color, location, direction, focus and attenuation of the light beam. Additional parameters may be defined for any given light source depending on the particular API being used. Likewise, many of these parameters may be set by default by the API unless an alternative value is specified. Defining light sources is well within the level of skill in the art and will not be discussed further.

This light source information is then transformed to eye coordinates using the model view matrix (M) at step 126. A well-known matrix transformation is performed during this process. In OpenGL, this transformation is performed since OpenGL specifies that lighting operations are to take place in eye coordinates. The light source information is then stored in eye coordinates.

A decision is then made at step 128 to either perform lighting in eye coordinates or object coordinates. This determination is revisited each time there is a modal state change, for example a light source changes or the model view matrix changes. The heuristic associated with this decision process is illustrated more fully in FIG. 5 and is discussed in more detail below. If, in step 128, it is determined that lighting should occur in object coordinates, the light source information is re-transformed to object coordinates at step 130. Re-transformation of the light source information from eye coordinates to object coordinates requires the light source information to be multiplied by an inverse transpose of the model view matrix ($M^{-T}$). Re-transformations are commonplace operations and the implementation of a reverse transformation using the model view matrix is well within the skill of someone of ordinary skill in the art. Once the light source information has been re-transformed to object coordinates 130, lighting is performed in object coordinates at step 132. The operations associated with performing lighting in object coordinates is considered to be well known in the art.

If, on the other hand, it is determined at step 128 that lighting calculations should take place in eye coordinates, the vertex data is transformed into eye coordinates using the model view matrix (step 129) and lighting calculations are then performed in eye coordinates at step 134. As noted above, lighting in eye coordinates is the standard specified by OpenGL. The implementation of lighting in eye coordinates is considered to be well known in the art and will not be described further.

FIG. 5 illustrates one embodiment of the operations performed by the dynamic light space selector 202 at block 128 of FIG. 4 when determining whether lighting should take place in object coordinates or eye coordinates. As shown in FIG. 5, many factors may be considered in the determination of the coordinate system for performing lighting. As discussed in detail below, not all of these factors are essential to this determination. The selection of certain combinations of the particular factors described below may vary depending on the implemented API, the hardware, the expected operations to be performed by the graphics system and other factors.

Initially, at step 136, the dynamic light space selector 202 determines if a user has manually selected always to perform lighting in eye coordinates. This enables the dynamic light space selector 202 to accommodate a user's preference, if specified, causing the geometry accelerator to perform lighting operations in the user's preferred coordinate system. If eye coordinate lighting has been selected, the heuristic will return a "No" result at step 128 in FIG. 4 (step 150) and proceed to perform lighting in eye coordinates.

If the user has not selected eye coordinate lighting, a determination is made as to whether texture generation is enabled (step 138) or fogging is enabled (step 140). In OpenGL, texture generation and fogging both take place in eye coordinates and both require that vertex data be transformed from object coordinates to eye coordinates. In this situation there may be little benefit to performing lighting in object coordinates since this would not eliminate performing a transformation of vertex data to eye coordinates. Moreover, since performing lighting in object coordinates requires the light source information to be re-transformed from eye coordinates to object coordinates, performing lighting in object coordinates is actually more resource intensive than performing lighting in eye coordinates when either texturing or fogging has been enabled.

It is next determined if the right-most column of the model view matrix is equal to [0 0 0 1] (step 142). In the matrix shown below, the right most column of the matrix is occupied by the letter "D":

ABCD
ABCD
ABCD
ABCD

This factor is considered in one embodiment of the invention, because it has been observed that, in certain implementations, object coordinate lighting does not always behave properly if the right-most column of the model view matrix (M) is not equal to [0 0 0 1]. The discrepancies have been mainly observed with respect to positional lights. Accordingly, unless the right-most column of the model view matrix is equal to [0 0 0 1], lighting is preferably performed in eye coordinates. Other empirically determined criteria may serve as appropriate criteria for preferring one coordinate system over another coordinate system. These criteria may emerge over time or may be specific to the API being used.

At step 144, the heuristic determines if the model view matrix (M) changes often. Since every change in the model view matrix requires the light source information to be re-transformed from eye coordinates to object coordinates, at some point it becomes more burdensome for the geometry accelerator to process the re-transformation of light source information from eye coordinates to object coordinates than it is for the geometry accelerator to process the transformation of the vertex data from object coordinates to eye coordinates. In this situation, it is more efficient to perform lighting in eye coordinates.

Determining whether it is cost-effective to perform lighting in object coordinates or eye coordinates by monitoring the frequency with which the model view matrix changes may be performed, for example, by monitoring the number of pieces of vertex data processed between successive changes in the model view matrix. The amount of vertex data that must be processed between successive changes in the mode view matrix to make object coordinate lighting advantageous will depend on many variables, such as the number of light sources defined by the user (which relates to the amount of light source information), the speed of the graphics hardware and other factors. Accordingly, the number of vertices that must be processed between successive changes to the model view matrix must be determined empirically. A person of ordinary skill in the art could make this determination as a matter of course, given the individual parameters of the processing system being employed. In general, if the amount of time it takes to transform vertex data to eye coordinates and perform lighting on that transformed vertex data is more than the amount of time it takes to transform the light source information from eye coordinates to object coordinates and perform lighting on the same amount of vertex data, then it is advantageous to perform lighting in object coordinates. Otherwise, it is advantageous to perform eye coordinate lighting. This may be represented mathematically as:

$$x(TimeVT(x)+TimeECL(x))>TimeLIT+x(TimeOCL(x)) \quad \text{Equation 1}$$

where, x=number of vertices

TimeVT(x)=time to transform a single vertex from object coordinates to eye coordinates;

TimeECL(x)=time to perform eye coordinate lighting on a single transformed vertex;

TimeLIT=time to transform light source information to object coordinates; and

TimeOCL(x)=time to perform object coordinate lighting on a single vertex.

In many situations, the time it takes to perform eye coordinate lighting on a single transformed vertex will be the same as, or almost the same as, the time it takes to perform object coordinate lighting on a single vertex. Accordingly, in this situation, TimeECL(x)=TimeOCL(x), and Equation 1 can be simplified as shown below:

$$x>TimeLIT/TimeVT(x). \quad \text{Equation 2}$$

Thus, in this situation, the number of vertices which must be processed between successive changes in the model view matrix must be greater than the time it takes to transform light source information to object coordinates, divided by the time it takes to transform a single vertex from object coordinates to eye coordinates.

The determination of whether the model view matrix changes too frequently (step 144) may involve monitoring the instantaneous number of vertices processed between successive changes in the model view matrix or may use another quantity, such as a running average of the number of vertices processed between successive changes in the model view matrix over a given number of successive model view matrix changes. The optimization of this process for various applications is well within the capabilities of persons of ordinary skill in the art.

The heuristic next determines whether object coordinate lighting has been manually selected (step 146). Selection of object coordinate lighting is similar to selection of eye coordinate lighting described above in connection with step 136. If object coordinate lighting is selected, the heuristic will return a "Yes" result at step 128 of FIG. 4 (step 154) if it is otherwise possible to perform object coordinate lighting. If object coordinate lighting has not been selected at step 146, the process proceeds to step 148.

In step 148, it is determined whether the transformation of vertex data from object coordinates to eye coordinates is acting as a constraint on the speed of processing vertex data, i.e., is forming a bottleneck. A bottleneck could be formed, for example, where the data was provided to the hardware faster than the hardware could transform the vertex data from object coordinates to eye coordinates.

In one embodiment, this determination is performed by analyzing the volume of data being transferred to the geometry accelerator, such as by considering the mode of the system. The mode of the system, in OpenGL, determines the speed with which the vertex data is transmitted from the OpenGL application ultimately to the hardware. In immediate mode, vertex data is individually transferred to the hardware using separate API calls. This is a relatively slow method of transferring data to the graphics hardware, that, given current processor speeds, usually provides the geometry accelerator with enough time to transform the vertex data from object coordinates into eye coordinates before subsequent vertex data is received. Thus, the transformation process from object coordinates to eye coordinates may not be a bottleneck on the speed of the computer graphics system when operating in immediate mode (given current processor speeds). Since, if this were the case, there is no advantage to be gained, it may be more efficient to perform lighting in eye coordinates and thereby avoid incurring costs associated with re-transformation of light source information from eye coordinates to object coordinates.

In other modes of operation, for example display list, vertex array or draw array set modes, vertex data arrives much faster. In these modes of operation, given current processor speeds, vertex data may arrive faster than the computer graphics system can transform the data from object coordinates to eye coordinates. Thus, the transformation of vertex data using the model view matrix may become a bottleneck when the computer graphics system is operating in one of these other modes. In such circumstances, lighting in object coordinates eliminates the transformation from object coordinates to eye coordinates thereby alleviating the bottleneck.

In the illustrated embodiment, if eye coordinate lighting is manually enabled (step 136), texture generation or fogging is enabled (steps 138 or 140), the right-most column of the model view matrix is not equal to [0001] (step 142), the model view matrix changes frequently (step 144) or the transformation of vertex data from object coordinates to eye coordinates is not causing a bottleneck in the process (step 148), then lighting is to be performed in eye coordinates. Accordingly, a "No" result is returned at step 128 in FIG. 4 (step 150). Otherwise, if object coordinate lighting is manually selected (step 146) or none of these conditions is met, it is determined that lighting should be performed in object coordinates.

Lighting in object coordinates is not possible in certain situations. For example, if the model view matrix is anisotropic, the matrix will not preserve angles between two vectors during re-transformation. Accordingly, re-transformation of light source information from eye coordinate space to object coordinate space may result in the introduction of errors into the lighting operation. Thus, object coordinate lighting cannot be performed if the model view matrix (M) is anisotropic. One of the more common situations that may cause the model view matrix to be anisotropic is where scaling takes place within the model view matrix such that the x, y and z axes are not all scaled by the same amount.

Accordingly, if it is determined that lighting should be performed in object coordinates, or if object coordinate lighting is manually selected (step 146), a determination is made as to whether the model view matrix is anisotropic (step 152). Since the determination of whether the model view matrix is anisotropic is resource intensive, this step is preferably relegated to the end of the heuristic.

It should be noted that when the model view matrix is anisotropic, the computer graphics system will perform lighting in eye coordinates and override the user's preference for performing lighting in object coordinates. Where the user's preference has been not accepted, the user may be notified optionally that the computer graphics system has performed lighting in eye coordinates instead of object coordinates. If the model view matrix is not anisotropic, lighting is to be performed in object coordinates and a "Yes" result is returned at step 128 of FIG. 4 (step 154).

Many of the determinations performed in FIG. 5 are optional when determining whether to light in object coordinates or eye coordinates. For example, it would be possible to use a heuristic that did not allow the user to mandate that either object coordinate lighting (step 146) or eye coordinate lighting (step 136) be used. Similarly, the heuristic could eliminate the determination of whether the model view matrix changed frequently compared to the number of pieces of vertex data processed (step 144). Indeed, one presently preferred exemplary embodiment of this invention does not make any such determination of how many pieces of vertex data are processed. Additionally, in an alternative embodiment, it may be mathematically possible to perform spherical texture mapping in object coordinates, thus removing step 140 from the heuristic. However, since an accurate re-transformation of light source information is not guaranteed when the model view matrix is anisotropic, it is strongly advisable to include the step 152.

Figure 6:
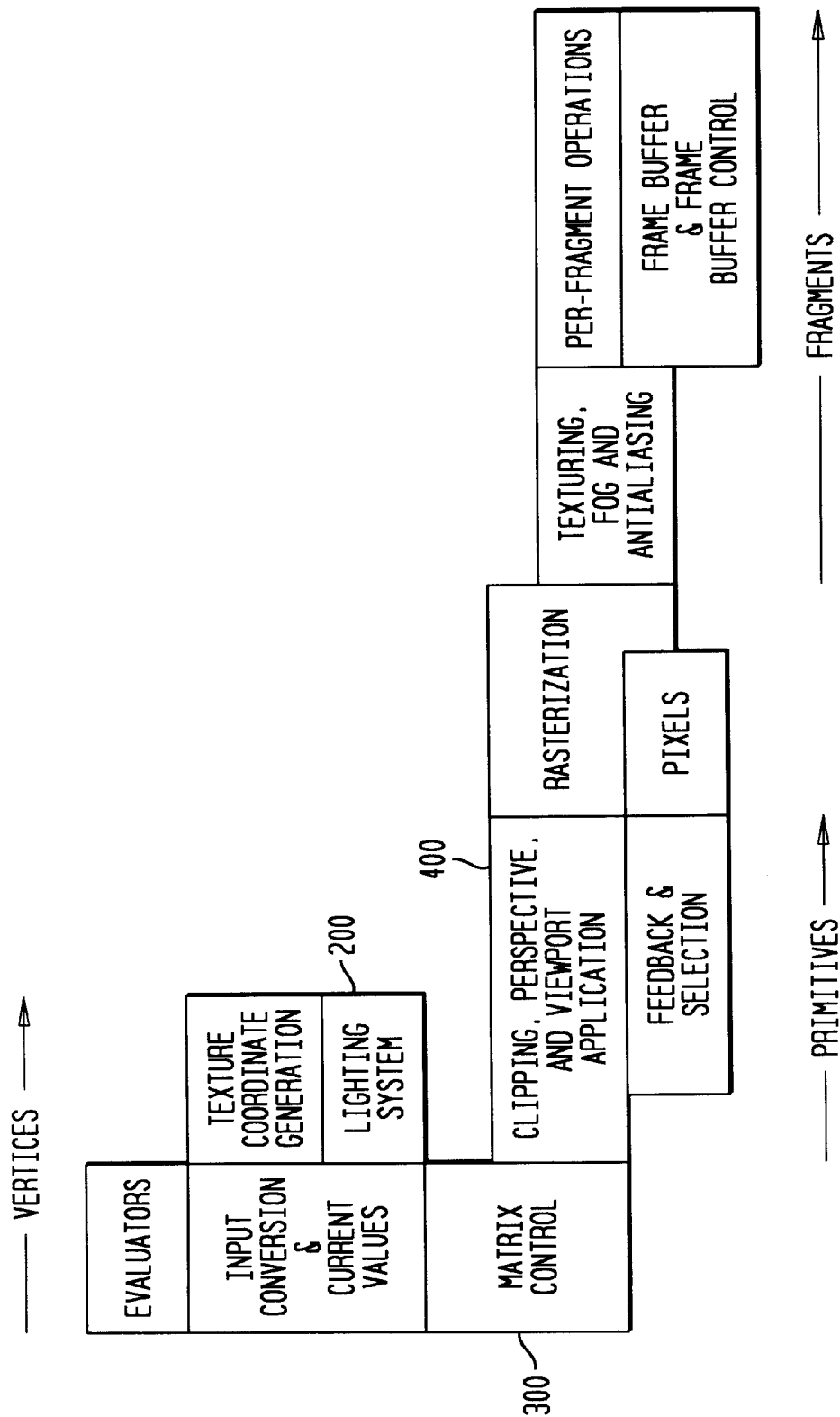
FIG. 6 is a functional block diagram of the OpenGL graphics system taken from the OpenGL reference manual in which dashed lines indicating the interconnection of components within and amongst the various blocks have been omitted.

FIGS. 6–9 illustrate a hardware embodiment of one aspect of this invention. FIG. 6 is a copy of the OpenGL graphics system taken from the OpenGL reference manual in which the dashed lines indicating interconnection of components within and amongst the various blocks have been omitted. In one embodiment of this invention, three subsystems of the OpenGL graphics system are modified. Specifically, the lighting subsystem 200, the matrix control subsystem 300, and the clipping, perspective and viewport application subsystem 400 are all modified in this embodiment. These three subsystems are set forth respectively in FIGS. 7–9.

Figure 7:
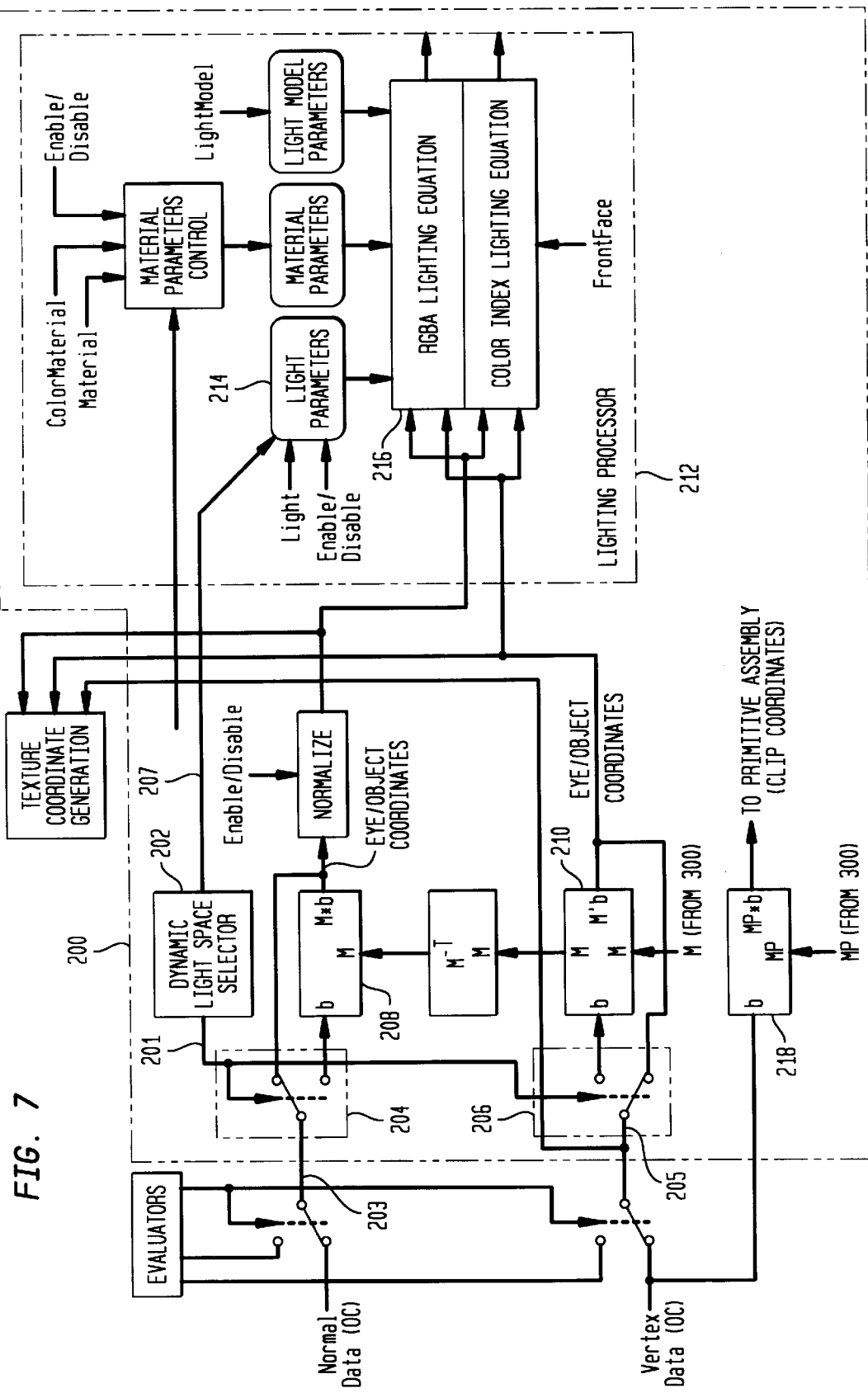
FIG. 7 is a functional block diagram of a lighting subsystem operable with the OpenGL graphics interface that has been configured, constructed and arranged in accordance with an aspect of this invention.
Figure 8:
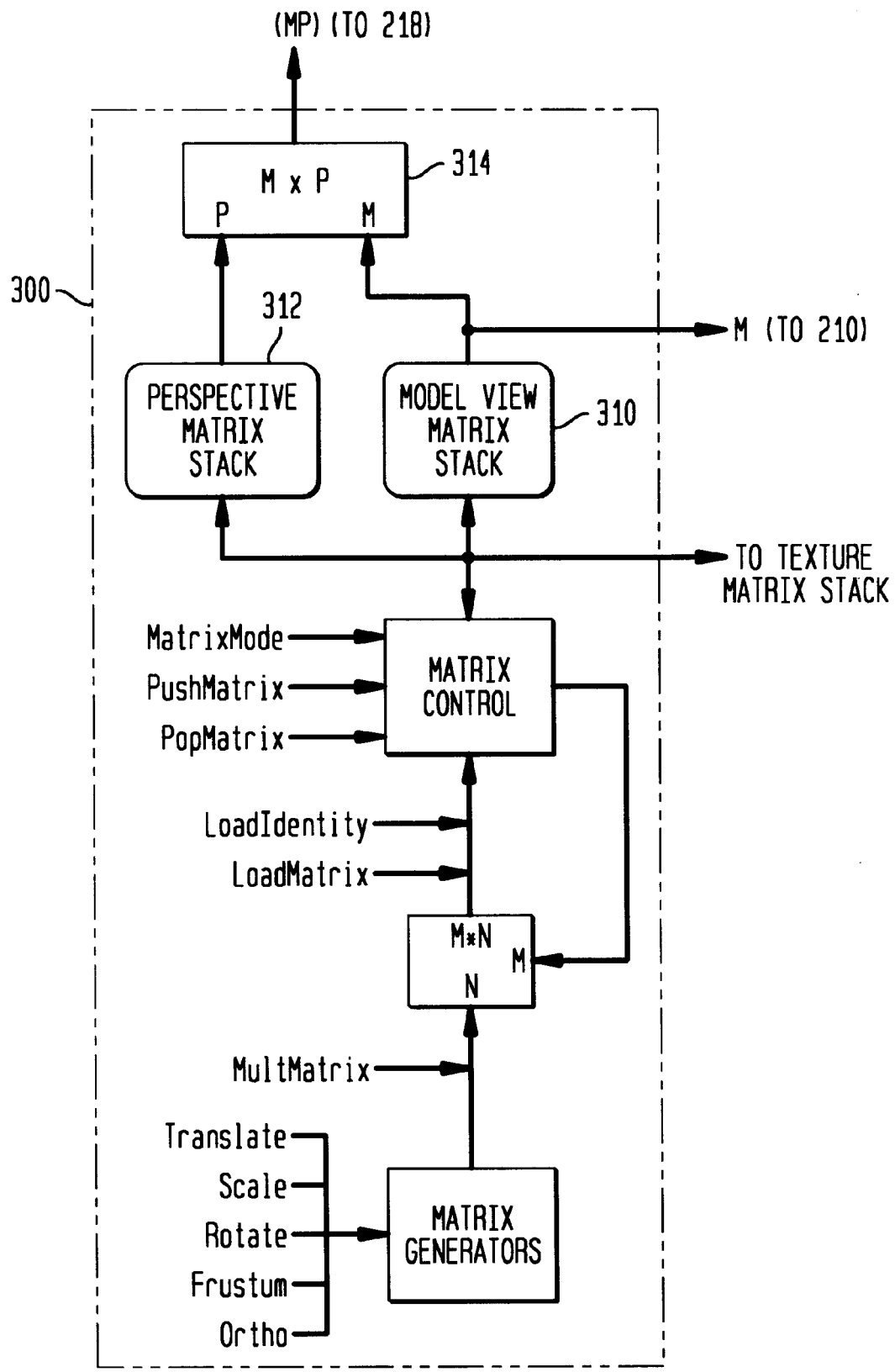
FIG. 8 is a functional block diagram of a matrix control subsystem operable with the OpenGL graphics interface that has been configured, constructed and arranged in accordance with an aspect of this invention.

As shown in FIG. 7, the lighting subsystem 200 selectively receives normal data on line 203 and vertex data on line 205 for processing with calculated lighting information in the lighting processor 212. In accordance with the present invention, a dynamic light space selector 202 determines whether lighting is to take place in eye coordinates or object coordinates. If the dynamic light space selector 202 determines that lighting should take place in eye coordinates, the dynamic light space selector 202 provides a signal on line 201 to switches 204 and 206 to cause the normal data on line 203 and vertex data on line 205 to be input to matrix multipliers 208 and 210 respectively. Matrix multipliers 208 and 210 receive the model view matrix M from the model view matrix stack 310 in matrix control subsystem 300 and perform matrix multiplication on the normal and vertex data, respectively, to transform the data from object to eye coordinates. Lighting in eye coordinates then takes place using this normal and vertex data in eye coordinates in the lighting processor 212.

If, on the other hand, the dynamic light space selector 202 determines that lighting should take place in object coordinates, the dynamic light space selector 202 provides a signal on line 201 to switches 204 and 206. In this situation, switches 204 and 206 cause the normal and vertex data to bypass the matrix multipliers 208 and 210, and to thereby be input directly to the lighting processor 212 where lighting takes place in object coordinates.

The dynamic light space selector 202 provides a signal on line 207 to the lighting processor 212 to control the lighting processor 212 to perform lighting in object coordinates or eye coordinates. If the computer graphics system is to perform lighting in eye coordinates, light source information from light parameters 214 is provided to the lighting equations 216 without being re-transformed into object coordinates. If, however, the computer graphics system is to perform lighting in object coordinates, the light source information from light parameters 214 is re-transformed into object coordinates prior to being provided to the lighting equations 216. A re-transformation of the light source information to object coordinates may be accomplished by multiplying the light source information by the inverse transpose of the model view matrix ($M^{-T}$). The dynamic light space selector provides a signal on line 207 to control whether the light source information is provided to the lighting equations 216 in eye coordinates or is first re-transformed from eye coordinates to object coordinates. A switch and matrix multiplier (not shown) in light parameters 214 can be used, for example, to select dynamically between these two coordinate systems.

To transform vertex data from object coordinates to clip coordinates, vertex data on line 205 is also received by a concatenated matrix transform 218 at an input b, multiplied by a concatenation matrix MP (see FIG. 8), and is output (in clip coordinates) at an output MP*b. The output of the concatenated matrix transform 218 is input to the primitive assembly (not shown) and then passed to the clipping, perspective and viewport application subsection illustrated in FIG. 9.

Figure 9:
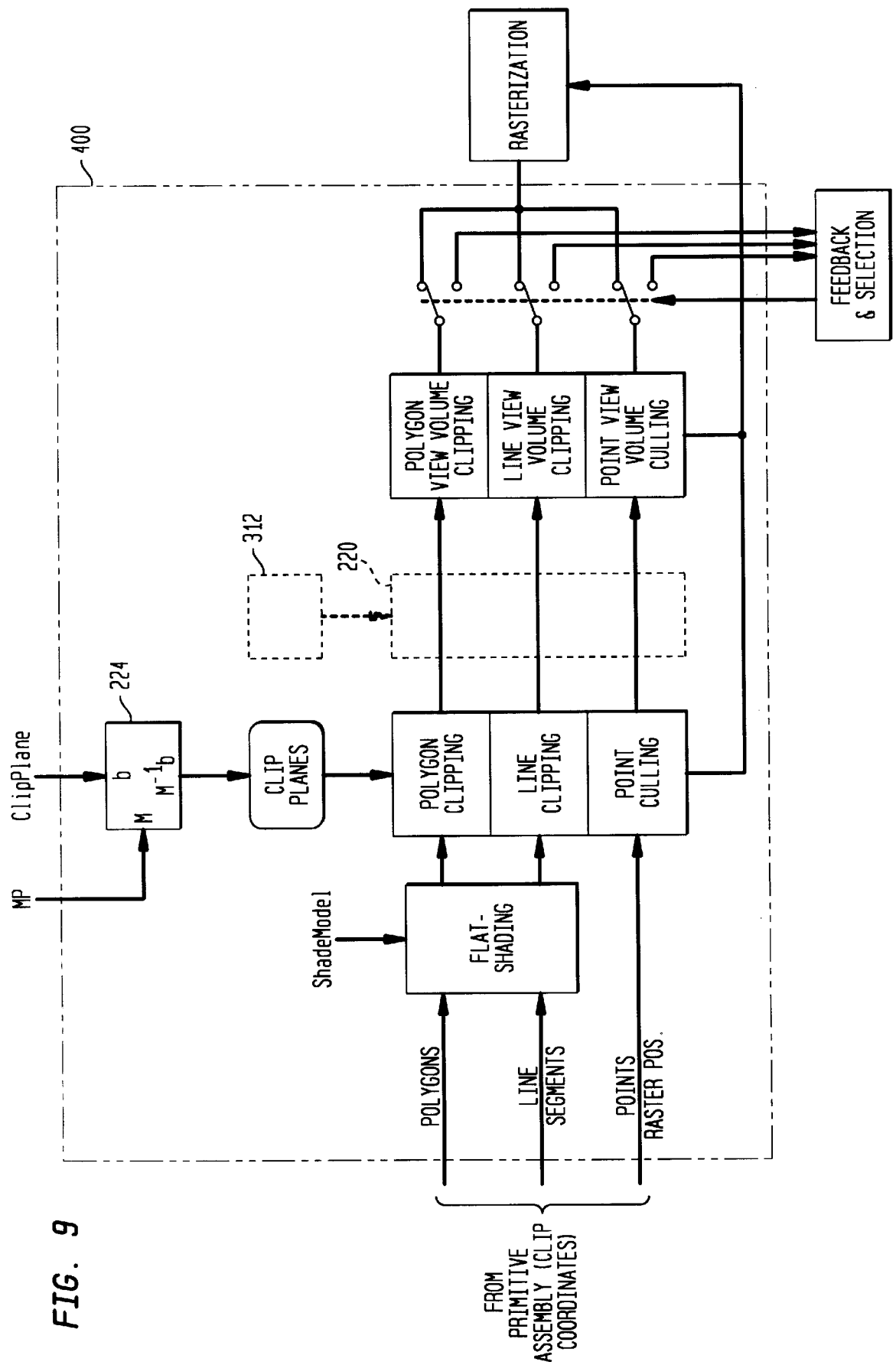
FIG. 9 is a functional block diagram of a clipping, perspective and viewport application subsystem operable with the OpenGL graphics interface that has been configured, constructed and arranged in accordance with an aspect of this invention.

As shown in FIG. 9 and as is well known, the clipping, perspective and viewport application subsystem 400 receives polygons, line segments and points raster positions from the primitive assembly (not shown) and performs model clipping and view clipping. Since the vertex data has been previously transformed directly from object coordinates to clip coordinates by the concatenated matrix transform 218 (FIG. 7), both model clipping and view clipping are performed in clip coordinates. Alternatively, if clipping is to be done in window coordinates (as shown in FIG. 3) the vertex data can be transformed directly from object coordinates to window coordinates and the clip planes can be transformed directly from clip coordinates to window coordinates.

In the standard OpenGL graphics system, model clipping was performed in eye coordinates and view clipping was performed in clip coordinates. Accordingly, the OpenGL graphics system provided that a transformation be performed from eye coordinates to clip coordinates after model clipping had taken place. In a graphics processor incorporating the present invention, since both model and view clipping are performed in clip coordinates (or window coordinates), it is no longer necessary to perform a transformation on the vertex data between clipping operations. Accordingly, to illustrate this difference from a standard OpenGL graphics system, dashed boxes 220 and 312 have been inserted indicating that the matrix transformer 220 and prospective matrix stack 312 have been removed from the clipping, perspective and viewport application subsystem 400. Further, the concatenated matrix MP is input to the concatenator matrix transform 224 from matrix control 300 to transform directly the clip planes from object coordinates to clip coordinates.

As shown in FIG. 7, the matrix control subsystem 300 provides matrix control to the perspective matrix stack 312, the model view matrix stack 310 and to the texture matrix stack (not shown). The OpenGL graphics system provided for the same level of control over these three matrix stacks. However, since the perspective matrix stack 312 was previously only used by the clipping, perspective and viewport application subsystem 400 shown in FIG. 9, the OpenGL graphics system included the perspective matrix stack 312 as part of that subsystem 400. Since clipping, in this embodiment, is done wholly in clip coordinates, the clipping, perspective and viewport application subsystem 400 no longer requires input from the perspective matrix stack 312. Accordingly, the perspective matrix stack 312 has been moved from the clipping, perspective and viewport application subsystem 400 to the matrix control subsystem 300.

The model view matrix M is provided from the model view matrix stack 310 to the lighting subsystem 200 to control the transformation of normal and vertex data from object coordinates to eye coordinates in the normal data and vertex data matrix multipliers 208 and 210 respectively.

The output of the perspective matrix stack 312 (the perspective matrix P) is combined with the output of the model view matrix stack (the model view matrix M) in the concatenator 314. The concatenator 314 multiplies the model view matrix M with the perspective matrix P to form concatenated matrix (MP). Note, in this regard, that matrix multiplication, while associative, is generally not commutative, i.e., M×P is not typically equal to P×M. The concatenator thus should preferably multiply M×P to form the concatenated matrix (MP). The concatenated matrix MP is provided to the concatenated matrix transform 218 in lighting subsystem 200 to control the transformation of vertex data from object coordinates to clip coordinates, and is provided to the concatenated matrix transform 224 in clipping, perspective and viewport application subsystem 400 to control the transformation of clip plan data from object coordinates to clip coordinates.

Figure 10:
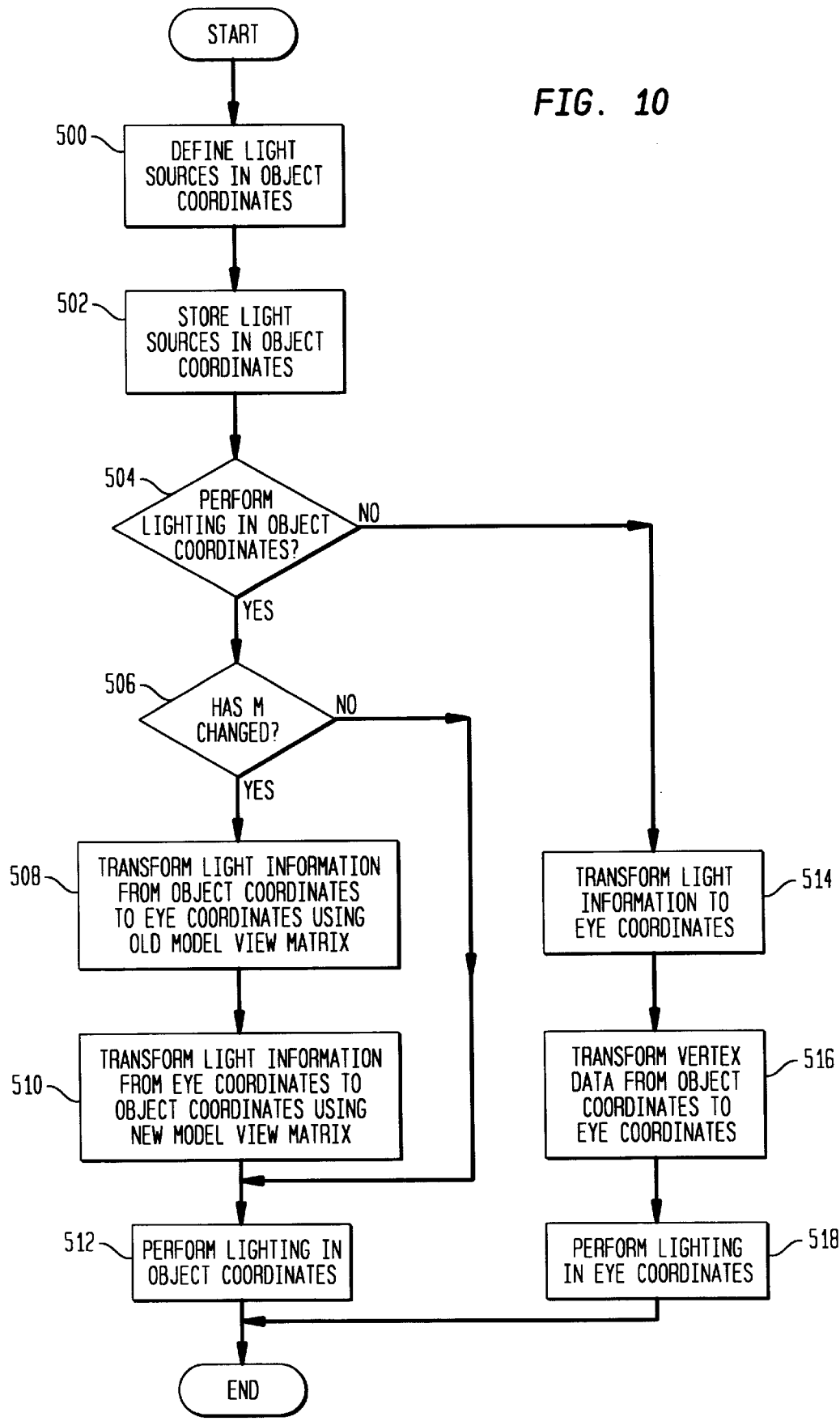
FIG. 10 is a flowchart exemplifying another embodiment of the operation of selecting dynamically the coordinate system in which lighting is to be performed.

FIG. 10 illustrates an alternative embodiment of the lighting coordinate selection method of the present invention that further minimizes the amount of information which must be transformed to perform lighting operations. According to the OpenGL standard, and as shown in FIG. 4, light source information is defined in object coordinates (step 124) and then is transformed to eye coordinates (step 126).

By contrast, in the embodiment illustrated in FIG. 10, after the light sources are defined in object coordinates (step 500), the light source information is not transformed immediately to eye coordinates, but rather is stored initially in object coordinates (step 502). A determination is then made whether to perform lighting in object coordinates or eye coordinates (step 504). Since this step is analogous to the determination performed at step 128 of FIG. 4 and as described in greater detail with respect to FIG. 5, it will not be described further at this time.

If it is determined that lighting operations should be performed in eye coordinates, the light source information is transformed to eye coordinates (step 514) and the vertex and normal data is transformed from object coordinates to eye coordinates using the model view matrix (step 516). Lighting is then performed in eye coordinates using the transformed vertex data and transformed light source information (518).

If, on the other hand, it is determined at step 504 that lighting should take place in object coordinates, an inquiry is made as to whether the model view matrix has changed since the light sources were defined. If the model view matrix has changed since the light sources were defined, the light information is transformed from object coordinates to eye coordinates using the original model view matrix and then re-transformed from eye coordinates to object coordinates using the new model view matrix.

If, however, the model view matrix has not changed since the light sources were defined, a transformation of information using the model view matrix and a re-transformation of using the inverse transpose of the model view matrix would not change the original light source data, since a matrix times its inverse transpose yields the identity matrix. Thus, in this situation, it is possible to perform lighting directly without transforming the lighting information at all. This results in an additional savings by decreasing the resources required to perform object coordinate lighting after the light sources have been defined but before the model view matrix changes. Specifically, by storing the light source information in object coordinates, it becomes possible to perform object coordinate lighting without performing any transformation (of vertex data or lighting data) using the model view matrix. The elimination of these transformation would, accordingly, be expected to result in an increase in overall speed of the graphics system.

The above description was provided using the OpenGL graphics interface to describe implementation of a lighting scheme whereby the coordinate system in which lighting is to be performed is dynamically determined. Other graphics application interfaces may have additional or different functionality thus requiring modifications to be made to the heuristic or other aspects of the implementation of this invention.

Likewise it may be possible to select dynamically those factors which are used by the heuristic which are used to select dynamically the lighting space in which lighting is to take place. For example, the computer graphics system could, in real time, evaluate how well the current heuristic was performing and modify the heuristic itself depending on the current operating parameters of the computer graphics system. Alternatively, the computer graphics system could be monitored, for example, to determine how frequently each or any step of the heuristic determines that eye coordinate lighting should be selected. The computer graphics system could then modify, on a real time basis, the organizational structure of the heuristic to optimize the order of the steps. In this manner, operation of a given heuristic may be optimized to thereby achieve enhanced characteristics and minimize the amount of resources required to be expended to implement the heuristic itself.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer graphics system, comprising:
    a lighting system that dynamically selects a lighting space in which to perform lighting, wherein said selection is determined based at least partially on a rate at which vertex data is provided to the computer graphics system.

2. The computer graphics system of claim 1, wherein the lighting system performs lighting by operating on vertex and normal data.

3. The computer graphics system of claim 2, further comprising:
an input for providing the vertex and normal data to the lighting system, and
a processing system that processes the vertex and normal data after lighting has been performed by the lighting system.

4. The computer graphics system of claim 3, wherein the processing system comprises a clipping, perspective and viewport application subsystem, a rasterization subsystem, and a frame buffer and control subsystem.

5. The computer graphics system of claim 1, wherein the selected lighting space is one of eye coordinate space and object coordinate space.

6. The computer graphics system of claim 1, wherein said selection of the light space is at least partially determined also by evaluating whether one of texture generation or fogging has been enabled.

7. The computer graphics system of claim 1, wherein each selectable light space is represented by a unique coordinate system, and wherein the at least two coordinate systems are configured to enable a transition between the two coordinate systems through a matrix transformation.

8. The computer graphics system of claim 7, wherein selection of the light space by the dynamic light space selector is at least partially determined by evaluating whether a reverse transformation is possible between said at least two unique coordinate systems.

9. The computer graphics system of claim 7, wherein selection of the light space by the dynamic light space selector is at least partially determined by evaluating numerical values associated with at least one of a row or a column of the matrix.

10. A method of dynamically selecting a lighting space in a computer graphics system, comprising:
dynamically selecting a preferred lighting coordinate system in which lighting is to be performed from one of a plurality of possible lighting coordinate systems based on whether functions other than lighting must take place on the data in a particular coordinate space.

11. The method of claim 10, further comprising:
storing light source information in a first lighting coordinate system of said plurality of possible lighting coordinate systems.

12. The method of claim 11, further comprising one of:
performing lighting in the first coordinate system when the selected lighting coordinate system is the first coordinate system; and
transforming the light source information from the first coordinate system to the selected lighting coordinate system and performing lighting in the selected lighting coordinate system when the selected lighting coordinate system is not the first coordinate system.

13. The method of claim 11, further comprising:
defining lighting sources in one of the possible coordinate lighting systems and transforming the light source information to the first lighting coordinate system prior to performing lighting.

14. The method of claim 10, wherein said plurality of possible lighting coordinate systems comprises:
an object coordinate system; and
an eye coordinate system.

15. The method of claim 12, wherein said dynamically selecting step is further based on whether functions other than lighting must take place on the data in a particular coordinate space.

16. The method of claim 12, wherein the step of dynamically selecting a preferred lighting coordinate system comprises the step of:
evaluating whether a transformation of light source information is possible between the first coordinate system and the selected lighting coordinate system.

17. The method of claim 12, wherein said dynamically selecting step is further based on a frequency with which a matrix defining a relationship between the first coordinate system and selected lighting coordinate system changes.

18. A lighting subsystem for use in a computer graphics system, comprising:
a dynamic light space selector,
a lighting processor, and
at least one switch operatively associated with and controlled by the dynamic light space selector to selectively enable the transformation of data from a first coordinate space to a second coordinate space prior to being input into the lighting processor,
wherein the dynamic light space selector controls the switch to selectively transform at least one of vertex data and normal data from the first coordinate space to the second coordinate space upon the occurrence of particular criteria including at least one of whether spherical texture mapping has been enabled, whether fogging has been enabled, whether a matrix defining a transformation from object coordinates to eye coordinates is anisotropic and whether the at least one of vertex data and normal data is being provided rapidly to the computer graphics system.

19. The lighting subsystem of claim 18, wherein the first and second coordinate space comprise object coordinate space and eye coordinate space.

20. The lighting subsystem of claim 18, further comprising:
at least one matrix multiplier that performs matrix multiplication on the data when transformation of the data was selectively enabled by the switch.

21. The lighting subsystem of claim 18, wherein the lighting processor comprises light parameters associated with the first coordinate space, and wherein the dynamic light space selector selectively enables a transformation of light source information operably associated with the light parameters from the first coordinate space to the second coordinate space before the light source information is used by the lighting processor.

22. The lighting subsystem of claim 21, wherein the dynamic light space selector selectively enables transformation of the light source information from the first coordinate space to the second coordinate space such that the light space parameters are provided to the lighting processor in a coordinate space identical to the coordinate space associated with the data.

23. A computer graphics system, comprising:
a lighting system that dynamically selects a lighting space in which to perform lighting, wherein said selection is determined based at least partially on whether one of texture generation or fogging has been enabled.

24. The computer graphics system of claim 23, further comprising:
an input for providing the vertex and normal data to the lighting system; and
a processing system that processes the vertex and normal data after lighting has been performed by the lighting system.

25. The computer graphics system of claim 23, wherein the selected lighting space is one of eye coordinate space and object coordinate space.

26. A computer graphics system, comprising:
a lighting system that dynamically selects a lighting space in which to perform lighting, wherein each selectable light space is represented by a unique coordinate system, and wherein said selection of the light space is determined based at least partially on whether transition between said at least two unique coordinate systems using a reverse transformation can be achieved.

27. The computer graphics system of claim 26, further comprising:
an input for providing the vertex and normal data to the lighting system, and
a processing system that processes vertex and normal data after lighting has been performed by the lighting system.

28. The computer graphics system of claim 26, wherein the selected lighting space is one of eye coordinate space and object coordinate space.

29. The computer graphics system of claim 26, wherein selection of the light space is at least partially determined by evaluating the rate at which vertex data is provided to the computer graphics system.

30. The computer graphics system of claim 26, wherein said selection of the light space is at least partially determined also by evaluating whether one of texture generation or fogging has been enabled.

31. The computer graphics system of claim 26, wherein selection of the light space is at least partially determined by evaluating numerical values associated with at least one of a row or a column of the matrix.

32. A method of dynamically selecting a lighting space in a computer graphics system comprising the step of:
dynamically selecting a lighting space in which to perform lighting based at least partially on a rate at which vertex data is provided to the computer graphics system.

33. The method of claim 32, further comprising the step of:
performing lighting in the selected lighting space.

34. The method of claim 33, further comprising the steps of:
providing the vertex and normal data to the lighting system; and
processing the vertex and normal data after said performing step has been performed.

35. The method of claim 32, wherein the selected lighting space is one of eye coordinate space and object coordinate space.

36. The method of claim 32, wherein said dynamically selecting step is further based on whether one of texture generation or fogging has been enabled.

37. A method of dynamically selecting a lighting space in a computer graphics system comprising the step of:
dynamically selecting a lighting space in which to perform lighting based at least partially on whether one of texture generation or fogging has been enabled.

38. The method of claim 37, further comprising the step of:
performing lighting in the selected lighting space.

39. The method of claim 37, further comprising the steps of:
providing the vertex and normal data to the lighting system; and
processing the vertex and normal data after said performing step has been performed.

40. The method of claim 37, wherein the selected lighting space is one of eye coordinate space and object coordinate space.

41. The method of claim 37, wherein said dynamically selecting step is further based on whether one of texture generation or fogging has been enabled.

42. The method of claim 12, further comprising the step of:
performing lighting in the selected lighting coordinate system.

43. A method of dynamically selecting a lighting space in a computer graphics system, comprising the step of:
dynamically selecting a preferred lighting coordinate system in which lighting is to be performed from one of a plurality of possible lighting coordinate systems based on whether functions other than lighting must take place on the data in a particular coordinate space.

44. The method of claim 43, further comprising the step of:
performing lighting in the selected lighting coordinate system.

45. The method of claim 43, further comprising the step of:
storing light source information in a first lighting coordinate system of said plurality of possible lighting coordinate systems.

46. The method of claim 45, further comprising either of the steps of:
performing lighting in the first coordinate system when the selected lighting coordinate system is the first coordinate system; and
transforming the light source information from the first coordinate system to the selected lighting coordinate system and performing lighting in the selected lighting coordinate system when the selected lighting coordinate system is not the first coordinate system.

47. The method of claim 45, further comprising the steps of:
defining lighting sources in one of the possible coordinate lighting systems; and
transforming the light source information to the first lighting coordinate system prior to performing lighting.

48. The method of claim 45, wherein the step of dynamically selecting a preferred lighting coordinate system is further based on whether a transformation of light source information is possible between the first coordinate system and the selected lighting coordinate system.

49. A method of dynamically selecting a lighting space in a computer graphics system, comprising:
storing light source information in a first lighting coordinate system of said plurality of possible lighting coordinate systems;
dynamically selecting a preferred lighting coordinate system in which lighting is to be performed from one of a plurality of possible lighting coordinate systems based on a frequency with which a matrix defining a relationship between the first coordinate system and selected lighting coordinate system changes; and
performing lighting in the selected lighting coordinate system.

50. The method of claim 49, further comprising the step of:

performing lighting in the first coordinate system when the selected lighting coordinate system is the first coordinate system.

51. The method of claim 49, further comprising the step of:

transforming the light source information from the first coordinate system to the selected lighting coordinate system and performing lighting in the selected lighting coordinate system when the selected lighting coordinate system is not the first coordinate system.

52. The method of claim 49, wherein said plurality of possible lighting coordinate systems comprises:

an object coordinate system; and an eye coordinate system.

53. The method of claim 49, wherein said step of dynamically selecting is further based on whether functions other than lighting must take place on the data in a particular coordinate space.

54. The method of claim 49, wherein said step of dynamically selecting is further based on a rate at which the data is provided to the computer graphics system.

* * * * *